United States Patent Office 2,939,877
Patented June 7, 1960

2,939,877
STABLE ESTERS OF POLYBORONIC ACIDS

Robert M. Washburn, Whittier, Calif., assignor to American Potash & Chemical Corporation, a corporation of Delaware No Drawing. Filed Jan. 29, 1959, Ser. No. 789,790

31 Claims. (Cl. 260—462)

This invention relates in general to the preparation of thermally and hydrolytically stable organo-boron compounds prepared from alkane or arenepolyboronic acids and dialkanol amines and which are soluble in hydrocarbons.

It is an object of this invention to provide a process whereby certain novel, hydrocarbon-soluble organo-boron compounds, generally described above, can be prepared.

Further objects and advantages of this invention, if not specifically set forth, will become apparent during the course of the description which follows:

Broadly, it has been found that alkylene polyboronic acids and arenepolyboronic acids, various of which are described in our co-pending applications Serial No. 596,-159, filed July 6, 1956, for Process for Preparing Organo-Boron Compounds, and Serial No. 766,016, filed October 8, 1959, for Process and Composition of Matter, can be reacted with dialkanol amines of the general formula R'N(R"OH)$_2$ to produce a new class of thermally and hydrolytically stable organo-boron compounds of the general formula

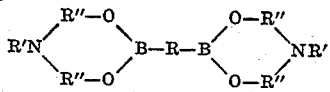

The symbol R represents an arene or substituted arene group or a lower alkylene group, such as butylene; R' represents hydrogen or a lower alkyl radical, preferably methyl, ethyl, propyl or butyl; the R" symbols represent the same or different alkylene radicals (straight or branched chain) originally having a hydroxy group bonded at one end or anywhere along the length thereof, the R" group having between 1 and 18 carbon atoms. Preferably, however, R" is an alkylene chain of between 2 and 3 carbon atoms since this results in rings of between 8 and 10 members (including the B and N). Rings of between 8 and 10 members are desired since this insures greatest hydrolytic stability for the compounds obtained.

As will be described in greater detail below, these materials are intended as antioxidants for hydrocarbon materials such as petroleum products and hence a high degree of solubility in such petroleum products is desired. Where R' is alkyl rather than H, the materials are somewhat more soluble; additionally, solubility may be increased by incorporating relatively large R" groups within the molecule.

A further factor to be considered with respect to the value of R" is the availability of the alkanolamine. Alkanolamines are most conveniently prepared by the reaction of an amine with an epoxide and the alkanolamines prepared by this route have only ethylene groups between the nitrogen and the hydroxy group. Since this synthetic approach is used to a very large extent in the preparation of alkanolamines, there are only a few important (and readily available) compounds having alkylene groups of greater chain length than two carbons. However, as is well known to those familiar with the aformentioned epoxide reaction, it provides means for preparing alkanolamines of the general formula

R'N[CH$_2$CH(R)OH]$_2$ where R may be any of a variety of side chains depending upon the nature of the epoxide reactant.

More particularly, where two moles of a dialkanol amine are reacted with each mole of an alkylenepolyboronic or arenepolyboronic acid of the general formula R[B(OH)$_2$]$_2$, one mole of the above-described type organo-boron compound is obtained.

The preparation of these N-substituted dialkanolamine esters is conveniently carried out in an inert organic solvent, such as benzene, toluene, hexane, octane, etc. The water which forms is conveniently removed by azeotropic distillation with the solvent. The amine is generally used in a slight excess to insure complete reaction. When the reaction is completed, the solvent is removed by evaporation and the crude product resulting conveniently may be recrystallized in the customary fashion from chloroform or water or other solvent for the impurities present. Alternatively, the reactants may be mixed and water removed by heating or blown out with an inert gas such as carbon dioxide or nitrogen.

Specific examples are set forth below showing preparation of various of the compounds of this invention, but these are for illustrative purposes and are not to be interpreted as imposing limitations on the scope of the invention other than as set forth in the appended claims.

EXAMPLE I.—PREPARATION OF BIS-N-BUTYLDIETHANOLAMINE BENZENE-1,3- AND -1,4-DIBORONATES

Ten grams (0.06032 mole) of a mixture of benzene-1,4- and -1,3-diboronic acid was placed in a 500 ml. flask and 19.45 g. (0.1206 mole) N-butyldiethanolamine rinsed into the flask with 55 ml. water. The reaction was mildly exothermic. All solids went into solution when the mixture was warmed gently on the steam bath. Approximately 100 ml. benzene was added and the mixture heated under azeotropic distillation conditions to remove a water-benzene azeotrope. When all water had been removed, a small quantity of the reaction mixture was evaporated to dryness and vacuum dried. The resulting crude material softened at 140° C. and melted at 175° C.

*Analysis.*—Calc. for C$_{22}$H$_{38}$B$_2$N$_2$O$_4$: B, 5.20; N, 6.73%. Found: B, 5.30; N, 6.69%.

The remaining reaction mixture was evaporated to dryness on a Rinco evaporator to give 25.1 g. of crude solids. The crude solids were dissolved in hot chloroform and filtered through glass wool. The filtrate deposited a crystalline (2.0 g. first crop) material which was removed by filtration and vacuum dried; M.P. 246–249° C.

*Analysis.*—Calc. for C$_{22}$H$_{38}$B$_2$N$_2$O$_4$: B, 5.20; N, 6.73%. Found: B, 5.12; N, 6.67%.

The infrared spectrum showed absorptions at 5.18, 5.46, 12.47, and no absorption at 13.94 μ confirming the material as bis-N-butyldiethanolamine benzene-1,4-diboronate.

The chloroform filtrate was evaporated on a Rinco evaporator yielding 18.3 g. of solids. A 5.3 g. portion of the solids lost 0.5 g. when vacuum dried; M.P. 166–167° C.

*Analysis.*—Calc. for C$_{22}$H$_{38}$B$_2$N$_2$O$_4$: B, 5.20; N, 6.73%. Found: B, 6.86; N, 6.39%.

The infrared spectrum had absorptions at 12.24 and 13.94 μ characteristic of 1,3-substitution confirming the structure as bis-N-butyldiethanolamine benzene-1,3-diboronate.

EXAMPLE II.—PREPARATION OF BIS(DIETHANOLAMINE) BENZENE-1,4-DIBORONATE

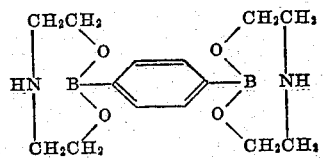

Benzene-1,4-diboronic acid (3.1 g., 0.019 mole), diethanolamine (5.7 g., 0.054 mole), and benzene were heated under reflux in a 250 ml. flask. Water was removed as the benzene-water azeotrope and separated in a Dean-Starke trap. The resulting crystalline product was removed by filtration and air dried to give a 99% yield of bis(diethanolamine)benzene-1,4-diboronate.

*Analysis.*—Calc. for $C_{14}H_{22}N_2B_2O_4$: B, 7.12; N, 9.22%. Found: B, 7.15.

A sample was recrystallized from methanol-water and reanalyzed. Found: B, 7.14; N, 9.02%.

Thus, there was no evidence for hydrolysis during crystallization. Bis(diethanolamine)benzene - 1,4 - diboronate is thermally stable up to about 295° C., where it starts to slowly decompose without melting.

In a series of additional experiments, the same general procedures were used throughout. In each instance, 1 g. (0.00603 mole) benzene-1,4-diboronic acid was used and 0.01276 mole (5.8 mole percent excess) of the amine was used. The boronic acid was placed in a 100 ml. flask and the amine was rinsed into the flask with approximately 30 ml. water whereupon a slight exothermic reaction occurred. Benzene was added and the benzene-water azeotrope was removed by distillation. When the reaction appeared complete, the reaction mixture was allowed to cool. The cooled reaction mixture was filtered and the filtrate evaporated to dryness. In each instance, the resulting crude product was recrystallized from chloroform. The analytical data for each of the materials so produced are set forth in the table below.

*Table A.—Data for the preparation of N-substituted diethanolamine esters of benzene-1,4-diboronic acid*

| Run No. | R' | Yield, percent | m.p., °C. | Analysis | | | |
|---|---|---|---|---|---|---|---|
| | | | | Found | | Theory | |
| | | | | N | B | N | B |
| 2 | $CH_3$ | 90.0 | 295 | | 6.49 | | 6.51 |
| 3 | $C_2H_5$ | 92.2 | 275 | 7.04 | 6.42 | 7.78 | 6.01 |
| 4 | $n-C_4H_9$ | 81.7 | 252 | 6.66 | 5.08 | 6.72 | 5.20 |
| 5 | $C_6H_5$ | 94.9 | | [a] | | | |

[a] Not analyzed—turned blue on standing.

As aforementioned, the dialkanol amines which can be reacted have the general formula $R'N(R''OH)_2$ and each $R''$ symbol may represent two dissimilar alkyl groups. However, such materials are generally unavailable and hence the incorporation of dissimilar $R''$ groups within the molecule does not represent a preferred embodiment of the invention.

Using the method set forth above, various other esters of polyboronic acid may be prepared: see table below.

*Table B*

| Diboronic Acid | Dialkanolamine | Product |
|---|---|---|
| $(HO)_2BC_6H_4B(OH)_2$ | $C_2H_5N[CH(CH_3)CH_2OH]_2$ | (structure) |
| $(HO)_2BC_6H_4B(OH)_2$ | $n-C_4H_9N(CH_2CH_2CH_2OH)_2$ | (structure) |
| $(HO)_2BC_6H_4B(OH)_2$ | $C_6H_5N(CH_2CH_2CH_2OH)_2$ | (structure) |
| $(HO)_2BC_4H_8B(OH)_2$ | $HN(CH_2CH_2OH)_2$ | (structure) |
| $(HO)_2BC_5H_{10}B(OH)_2$ | $HN(CH_2CH_2OH)_2$ | (structure) |

As noted earlier, each of these materials is hydrolytically and thermally stable and is soluble in hydrocarbons. The bond joining the boron and the adjacent arene group oxidizes, making these materials excellent antioxidants for petroleum and other organics such as aniline and catechol.

Obviously, many modifications and variations of this invention may be made without departing from the spirit and scope thereof and only such limitations should be imposed as are indicated in the appended claims.

I claim:

1. A process for the preparation of organo-boron compounds comprising: reacting a polyboronic acid of the general formula $R[B(OH)_2]_2$ with a dialkanolamine of the general formula $R'N(R''OH)_2$, where R is selected from the class consisting of lower alkylene and phenylene, R' is selected from the group consisting of hydrogen, lower alkyl and aryl and R'' is an alkylene group having between 1 and 18 carbon atoms.

2. The process of claim 1 wherein R is phenylene, R' is methyl and R'' is ethylene.

3. The process of claim 1 wherein R is phenylene, R' is ethyl and R'' is ethylene.

4. The process of claim 1 wherein R is phenylene, R' is butyl and R'' is ethylene.

5. The process of claim 1 wherein R is phenylene, R' is phenyl and R'' is ethylene.

6. The process of claim 1 wherein R' is hydrogen.

7. The process of claim 1 wherein R' is methyl.

8. The process of claim 1 wherein R' is ethyl.

9. The process of claim 1 wherein R' is butyl.

10. The process of claim 1 wherein R' is phenyl.

11. The process of claim 1 wherein R is phenylene.

12. The process of claim 1 wherein R is amylene.

13. The process of claim 1 wherein R is butylene.

14. The process of claim 1 wherein R'' is ethylene.

15. The process of claim 1 wherein R'' is propylene.

16. The compound

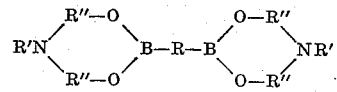

wherein R' is selected from the class consisting of hydrogen, lower alkyl and aryl, R'' is an alkylene radical having between 1 and 18 carbon atoms, and R is selected from the class consisting of lower alkylene and phenylene.

17. The compound of claim 16 wherein R' is hydrogen.

18. The compound of claim 16 wherein R' is methyl.

19. The compound of claim 16 wherein R' is ethyl.

20. The compound of claim 16 wherein R' is butyl.

21. The compound of claim 16 wherein R' is phenyl.

22. The compound of claim 16 wherein R is phenylene.

23. The compound of claim 16 wherein R is amylene.

24. The compound of claim 16 wherein R is butylene.

25. The compound of claim 16 wherein R'' is ethylene.

26. The compound of claim 16 wherein R'' is propylene.

27. The N-butyldiethanolamine ester of benzene-diboronic acid.

28. The N-methyldiethanolamine ester of benzene-diboronic acid.

29. The N-ethyldiethanolamine ester of benzene-diboronic acid.

30. The N-phenyldiethanolamine ester of benzene-diboronic acid.

31. The diethanolamine ester of benzene-diboronic acid.

No references cited.